US012699643B2

(12) United States Patent
       Pham

(10) Patent No.:      US 12,699,643 B2
(45) Date of Patent:          Aug. 4, 2026

(54) AUTOMATED TEST IDENTIFICATION AND IMPLEMENTATION IN A DATABASE ENVIRONMENT

(71) Applicant: Gusto, Inc., San Francisco, CA (US)

(72) Inventor: Ngan Duy Pham, Milpitas, CA (US)

(73) Assignee: Gusto, Inc., San Francisco, CA (US)

( * ) Notice:   Subject to any disclaimer, the term of this patent is extended or adjusted under 35 U.S.C. 154(b) by 275 days.

(21) Appl. No.: 18/646,371

(22) Filed:      Apr. 25, 2024

(65)                Prior Publication Data

US 2025/0335336 A1      Oct. 30, 2025

(51) Int. Cl.
     *G06F 8/70*          (2018.01)
     *G06F 11/3668*       (2025.01)
     *G06F 8/75*          (2018.01)
     *G06F 16/25*         (2019.01)
     *H04L 43/50*         (2022.01)

(52) U.S. Cl.
     CPC .............. *G06F 11/368* (2013.01); *G06F 8/70* (2013.01); *G06F 11/3688* (2013.01); *G06F 11/3696* (2013.01); *G06F 8/75* (2013.01); *G06F 16/25* (2019.01); *H04L 43/50* (2013.01)

(58) Field of Classification Search
     CPC .......... G06F 8/75; G06F 8/70; G06F 11/3676; G06F 16/25; G06F 11/368; G06F 11/3696; G06F 11/3698; H04L 43/50
     See application file for complete search history.

(56)                References Cited

U.S. PATENT DOCUMENTS

| | | | | |
|---|---|---|---|---|
| 9,983,981 | B1 * | 5/2018 | Mundada | ............ G06F 11/3676 |
| 10,057,184 | B1 * | 8/2018 | Prahlad | ................... H04L 43/50 |
| 2002/0091702 | A1 * | 7/2002 | Mullins | .................. G06F 16/25 |
| 2015/0363294 | A1 * | 12/2015 | Carback, III | ............ G06F 8/70 |
| | | | | 717/132 |
| 2024/0403199 | A1 * | 12/2024 | Eizenman | ................. G06F 8/75 |

OTHER PUBLICATIONS

Gu et al, CN 105117335 (translation), Nov. 10, 2017, 4 pgs <CN_105117335.pdf>.*

* cited by examiner

*Primary Examiner* — Tuan A Vu
(74) *Attorney, Agent, or Firm* — Fenwick & West LLP

(57)                ABSTRACT

A codebase system that maintains and utilizes a dynamic mapping between a collection of tests and files within a codebase to ensure error detection and code validity. The codebase system accesses a collection of tests configured to process files within the codebase to identify errors. It then generates a mapping by executing these tests to determine the specific files each test operates on. Upon detecting updates to the test collection, the codebase system updates this mapping by re-executing the updated tests, identifying the new set of files for each test, and aggregating these updates into the existing mapping. When changes to the files in the codebase are detected, the codebase system accesses the updated mapping to identify which tests relate to the altered files. The codebase system then executes this relevant subset of tests to validate the modifications made to the files.

20 Claims, 9 Drawing Sheets

400

UI for Aggregating Multiple Mappings
600

Log Timeline Environment

✓ ◉ Aggregate Test Mappings bin/rails ci : aggregate_test_mapping_results   ⊘ Waited 11s ~ Ran in 8m 34s   ⊚ ip-10-2-24-249.us-west-2.com...

Artifacts ☐ 1

◆ Theme  ⊞ Delete  ⬇ Download  ⧉ Raw  → Jump to end

+ Expand groups  −  Collapse groups  ⊡ Show timestamps

```
873  File: tmp/ci-artifacts/test_mapping.018c63f2-1232-4875-9cbe-089a79e88239.json.gz / Time: 0.09388120800031174
874  File: tmp/ci-artifacts/test_mapping.018c63f2-1232-493c-913a-f1096fa39728.json.gz / Time: 0.11903138799971202
875  File: tmp/ci-artifacts/test_mapping.018c63f2-1233-414e-ba6b-27a34585c251.json.gz / Time: 0.12188864299992524
876  File: tmp/ci-artifacts/test_mapping.018c63f2-1233-4aca-baff-82d1e79447ec.json.gz / Time: 0.09414401699996233
877  File: tmp/ci-artifacts/test_mapping.018c63f2-1234-418d-86bb-42b2fe873be0.json.gz / Time: 0.09919511999956093
878  File: tmp/ci-artifacts/test_mapping.018c63f2-1234-462a-969a-1a1b4a96c0e8.json.gz / Time: 0.12787806900019455
879  File: tmp/ci-artifacts/test_mapping.018c63f2-1234-4962-87de-b462ef13bdf0.json.gz / Time: 0.15803691699966294
880  File: tmp/ci-artifacts/test_mapping.018c63f2-1235-41fb-9ad6-304581a80a55.json.gz / Time: 0.11041301099976408
881  File: tmp/ci-artifacts/test_mapping.018c63f2-1235-47e3-8719-8ab8e14fd93f.json.gz / Time: 0.14783669200005534
882  File: tmp/ci-artifacts/test_mapping.018c63f2-1235-4c07-b189-098196b70dd3.json.gz / Time: 0.10574619100043492
883  File: tmp/ci-artifacts/test_mapping.018c63f2-1236-457b-8885-e650ce98d511.json.gz / Time: 0.13879024000016216
884  File: tmp/ci-artifacts/test_mapping.018c63f2-1236-49e6-8424-1dd46b2bbeac.json.gz / Time: 0.15126452999999349
885  File: tmp/ci-artifacts/test_mapping.018c63f2-1237-40c2-9aba-d42f75a1a760.json.gz / Time: 0.17964083100001425
886  File: tmp/ci-artifacts/test_mapping.018c63f2-1238-4257-a62b-431cd418139e.json.gz / Time: 0.14511542099990038
887  File: tmp/ci-artifacts/test_mapping.018c63f2-1238-4d1d-84dc-649863023040.json.gz / Time: 0.14895051300027262
888  File: tmp/ci-artifacts/test_mapping.018c63f2-1238-4dce-a7b3-d37f3c6ba5df.json.gz / Time: 0.15778405200035195
889  File: tmp/ci-artifacts/test_mapping.018c63f2-1239-4ac8-b723-1142b1ce37dd.json.gz / Time: 0.16305661899968982
890  File: tmp/ci-artifacts/test_mapping.018c63f2-1239-4e8c-96ad-a6f463109809.json.gz / Time: 0.20701124500010337
891  File: tmp/ci-artifacts/test_mapping.018c63f2-123a-44f4-b197-5a96093d5552.json.gz / Time: 0.17706161899968872
892  File: tmp/ci-artifacts/test_mapping.018c63f2-123a-4fd9-bfc3-6d67a51abeae.json.gz / Time: 0.16461325900036172
893  File: tmp/ci-artifacts/test_mapping.018c63f2-123b-46d2-83c9-6169218a2bbd.json.gz / Time: 0.16399562199967477
894  File: tmp/ci-artifacts/test_mapping.018c63f2-123b-4cc3-9d5b-889bec b2f080.json.gz / Time: 0.20169728000001895
895  File: tmp/ci-artifacts/test_mapping.018c63f2-123b-4fde-b25e-84a9510a443a.json.gz / Time: 0.17735117000029277
896  File: tmp/ci-artifacts/test_mapping.018c63f2-123c-410c-9477-1771bf7612f2.json.gz / Time: 0.14581958700000054
897  File: tmp/ci-artifacts/test_mapping.018c63f2-123c-4baa-9563-3fdbc6ab71d9.json.gz / Time: 0.17128072099996754
898  File: tmp/ci-artifacts/test_mapping.018c63f2-123c-4ec5-84ee-098403bd044e.json.gz / Time: 0.68715700199993669
899  File: tmp/ci-artifacts/test_mapping.018c63f2-123d-4016-8138-27508 0c0f518.json.gz / Time: 0.13853117899998324
900  File: tmp/ci-artifacts/test_mapping.018c63f2-123d-4aee-b5e3-67f6bf924a3f.json.gz / Time: 0.14085949299987988
901  File: tmp/ci-artifacts/test_mapping.018c63f2-123e-4145-89d8-14c2f8bc9d7e.json.gz / Time: 0.14582461000009062
902  File: tmp/ci-artifacts/test_mapping.018c63f2-123e-4439-b8c7-67a1063c5ece.json.gz / Time: 0.18325930899936793
903  File: tmp/ci-artifacts/test_mapping.018c63f2-123e-4d0e-afe6-8d1f0ccabd88.json.gz / Time: 0.15242086699981883
904  File: tmp/ci-artifacts/test_mapping.018c63f2-123f-4ace-a630-cd4fe62e5663.json.gz / Time: 0.24789202200000873
905  File: tmp/ci-artifacts/test_mapping.018c63f2-123f-4b3e-a832-928eb881e9cd.json.gz / Time: 0.19458289499992574
906  File: tmp/ci-artifacts/test_mapping.018c63f2-123f-4d34-b920-8b8360fa5ed0.json.gz / Time: 0.20798819999981788
907  File: tmp/ci-artifacts/test_mapping.018c63f2-1240-46cc-9435-7b0f124ac19e.json.gz / Time: 0.21685982200051512
908  File: tmp/ci-artifacts/test_mapping.018c63f2-1240-46e5-8bb1-9ccdb512b951.json.gz / Time: 0.20842938199984928
909  File: tmp/ci-artifacts/test_mapping.018c63f2-1240-49a0-9c9c-d1577969 79d2.json.gz / Time: 0.22613566400001395
910  File: tmp/ci-artifacts/test_mapping.018c63f2-1241-4081-be99-f179496dca55.json.gz / Time: 0.16787258600015775
```

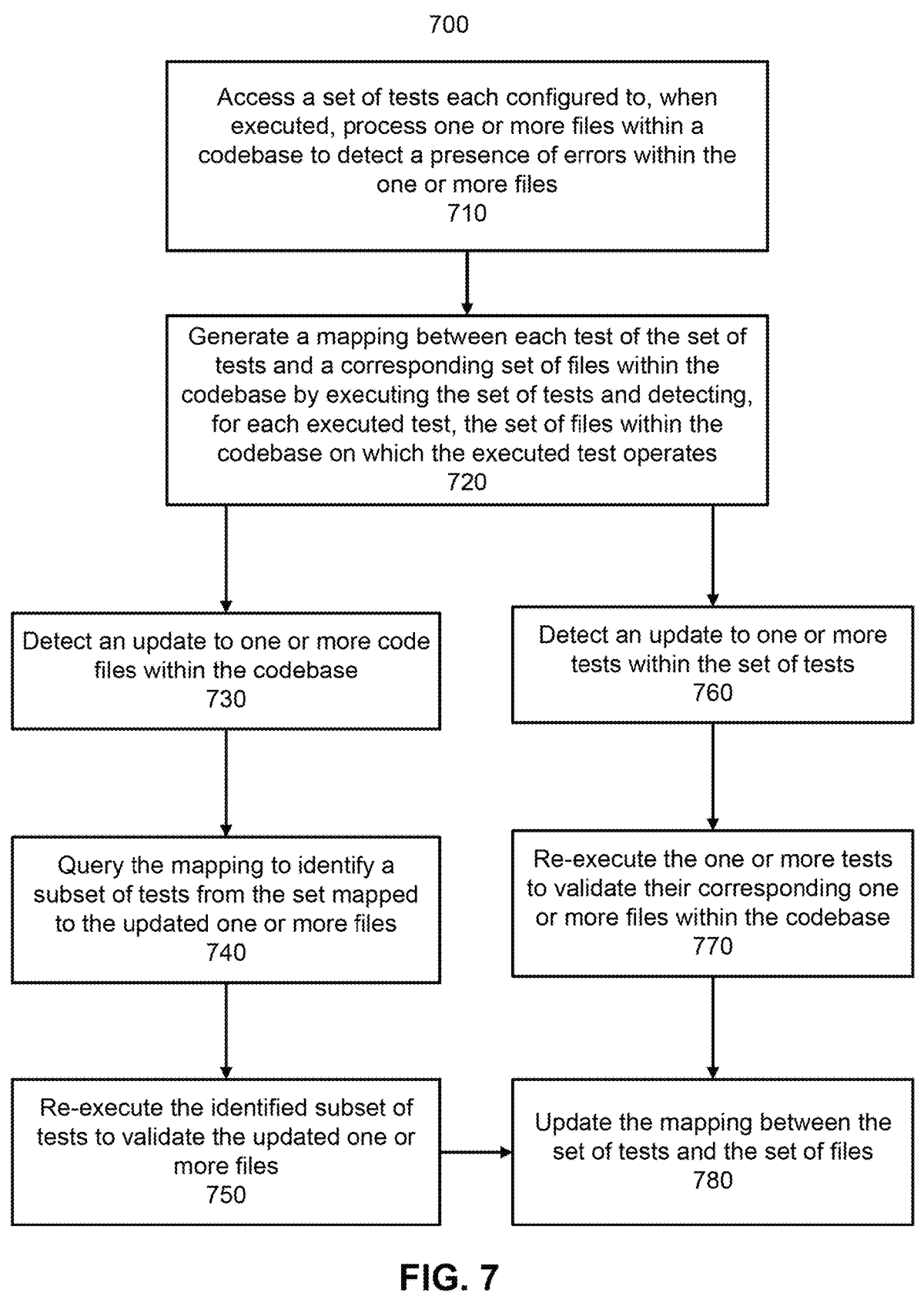

```
┌─────────────────────────────────────────────┐
│  Access a set of tests each configured to,   │
│  when executed, process one or more files    │
│  within a codebase to detect a presence of   │
│  errors within the one or more files         │
│                    710                       │
└─────────────────────────────────────────────┘
                      │
                      ▼
┌─────────────────────────────────────────────┐
│  Generate a mapping between each test of the │
│  set of tests and a corresponding set of     │
│  files within the codebase by executing the  │
│  set of tests and detecting, for each        │
│  executed test, the set of files within the  │
│  codebase on which the executed test operates│
│                    720                       │
└─────────────────────────────────────────────┘
           │                       │
           ▼                       ▼
┌────────────────────┐   ┌────────────────────┐
│ Detect an update   │   │ Detect an update   │
│ to one or more     │   │ to one or more     │
│ code files within  │   │ tests within the   │
│ the codebase       │   │ set of tests       │
│        730         │   │        760         │
└────────────────────┘   └────────────────────┘
           │                       │
           ▼                       ▼
┌────────────────────┐   ┌────────────────────┐
│ Query the mapping  │   │ Re-execute the one │
│ to identify a      │   │ or more tests to   │
│ subset of tests    │   │ validate their     │
│ from the set       │   │ corresponding one  │
│ mapped to the      │   │ or more files      │
│ updated one or     │   │ within the         │
│ more files         │   │ codebase           │
│        740         │   │        770         │
└────────────────────┘   └────────────────────┘
           │                       │
           ▼                       ▼
┌────────────────────┐   ┌────────────────────┐
│ Re-execute the     │   │ Update the mapping │
│ identified subset  │──▶│ between the set of │
│ of tests to        │   │ tests and the set  │
│ validate the       │   │ of files           │
│ updated one or     │   │        780         │
│ more files         │   │                    │
│        750         │   │                    │
└────────────────────┘   └────────────────────┘
```

FIG. 7

AUTOMATED TEST IDENTIFICATION AND IMPLEMENTATION IN A DATABASE ENVIRONMENT

BACKGROUND

This disclosure relates generally to codebase systems and, more specifically, to optimizing test execution in codebase systems.

A codebase refers to a collection of code used to build an application or project. It encompasses source code, libraries, dependencies, test code, and documentation, among other components. For instance, the application or project might be designed to manage a centralized database system, such as employment management database systems, that stores large amounts of data for the various entities associated with these systems.

As the application evolves, it may undergo enhancements and modifications. These modifications often require a suite of tests to ensure that the software continues to meet its intended requirements and functions correctly. These tests are crucial for identifying bugs or flaws that could negatively impact the user experience, reliability, and overall performance of the software. For example, certain tests ensure that any changes do not adversely affect the software's other components, thus maintaining the integrity of the codebase over time. Other tests identify bottlenecks and areas that may not perform well under heavy loads, allowing developers to address these issues proactively.

Accordingly, codebase testing is a critical phase in the software development lifecycle, aimed at ensuring that the application meets its specifications, is free of defects, and delivers a quality experience to the end-user. However, this process can be time-consuming and resource-intensive. Large and complex codebases require extensive testing to cover all possible use cases, interactions between components, and edge cases. The greater the complexity and size, the more tests are needed, increasing the time and resources required to ensure comprehensive coverage.

SUMMARY

Embodiments described herein include a codebase system that maintains and utilizes a dynamic mapping between a collection of tests and files within a codebase to ensure error detection and code validity. The codebase system accesses a collection of tests configured to process files within the codebase to identify errors. It then generates a mapping by executing these tests to determine the specific files each test operates on. Upon detecting updates to the test collection, the codebase system updates this mapping by re-executing the updated tests, identifying the new set of files for each test, and aggregating these updates into the existing mapping. When changes to the files in the codebase are detected, the codebase system accesses the updated mapping to identify which tests relate to the altered files. The codebase system then executes this relevant subset of tests to validate the modifications made to the files.

In cases where certain tests are not executed successfully, the method provides for either the aggregation of results from the completed tests into the existing mapping or the generation and aggregation of a new mapping based on the execution of the incomplete subset of tests. This approach ensures that the codebase system maintains an up-to-date and accurate mapping between tests and codebase files, facilitating effective error detection and code validation.

BRIEF DESCRIPTION OF THE DRAWINGS

The disclosed embodiments have other advantages and features which will be more readily apparent from the detailed description, the appended claims, and the accompanying figures (or drawings). A brief introduction of the figures is below.

FIG. 6 illustrates an example GUI for aggregating test mappings in accordance with one or more embodiments.

FIG. 7 illustrates an example method for dynamically executing tests upon detection of file modification in accordance with one or more embodiments.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

In modern development environments, codebases often include extensive code files accompanied by a large number of test files. This extensive collection of tests ensures the robustness and reliability of the source code. However, whenever a developer proposes a code change (e.g., through a GitHub Pull Request), a comprehensive testing process is triggered. To validate the proposed change, the system often re-runs the entire suite of tests, which can take many hours or several days to complete. This testing process, essential for upholding code quality, entails substantial costs in terms of computing resources and/or time.

Embodiments described herein address the above-described challenge by a codebase system implementing a mapping module. This approach involves creating a graph that connects runtime code with corresponding test files. By initiating the test suit in an "analysis mode," the mapping module is able to identify which runtime files are accessed during the execution of each test. This analysis may be conducted for every test in the suite to construct a comprehensive graph. This graph maps each test to the specific runtime files it interacts with. By inverting this graph, the system is able to pinpoint exactly which tests need to be executed in response to modifications in any given set of runtime files. This targeted approach streamlines the testing process, enhancing efficiency by only running the tests relevant to the changed code.

In some embodiments, the mapping module may use Ruby's TracePoint to track code traversal during test executions, enabling mapping of the interaction between tests and runtime files. In some embodiments, the mapping module may also be able to bridge a gap between frontend and backend development by leveraging JavaScript Code Coverage tools. These tools allow the mapping module to monitor frontend code coverage and relay this information to a backend test suite. As a result, the mapping module can create a mapping that links frontend runtime files to appropriate backend tests, further enhancing testing capability and efficiency.

Accordingly, the codebase system described herein improves the testing process by significantly reducing the time and computing resources required to maintain high standards of code quality.

System Architecture

Figure 1:
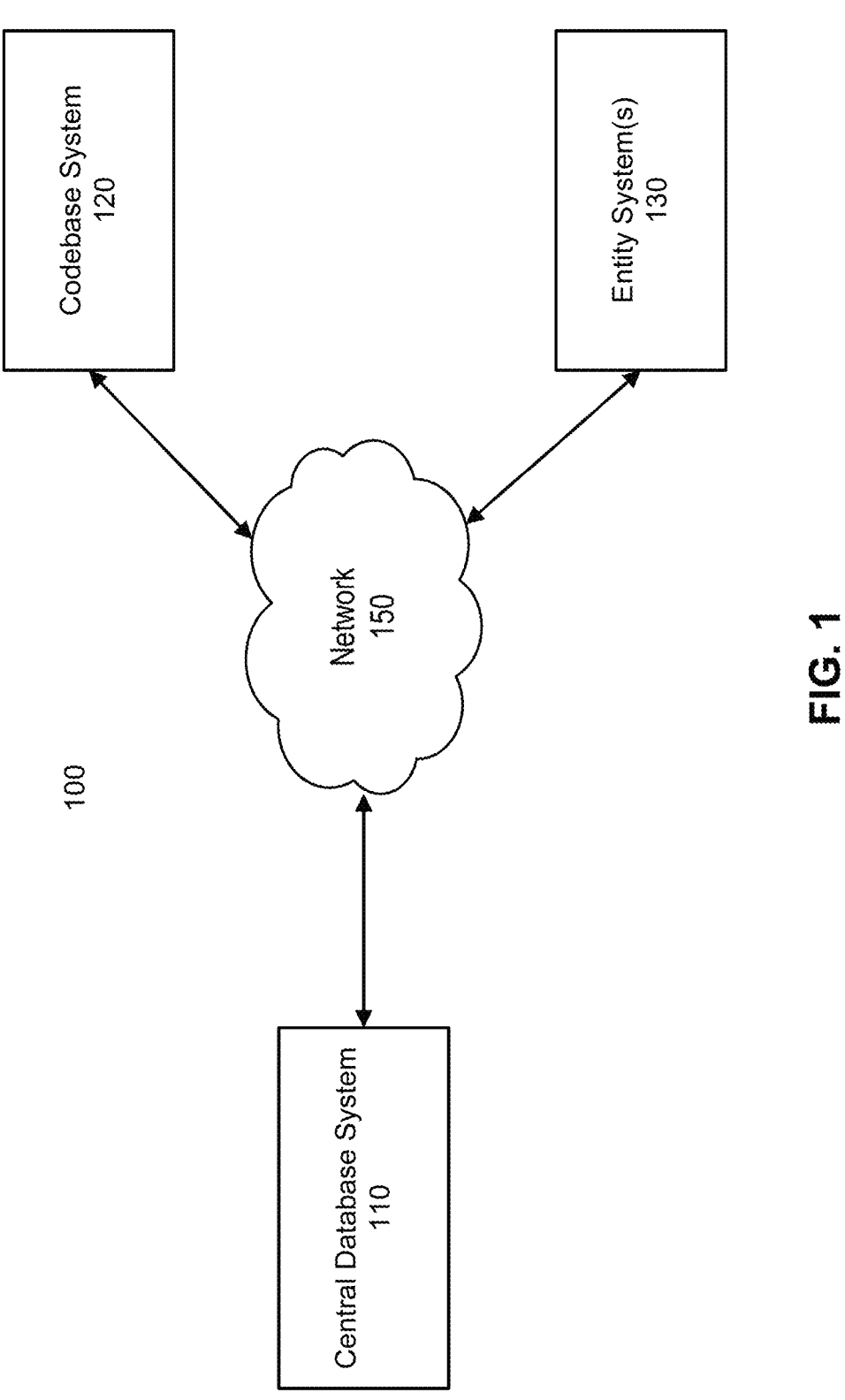
FIG. 1 is a block diagram of a system environment in which a codebase system operates, in accordance with one or more embodiments.

FIG. 1 is a block diagram of a system environment 100 in which a codebase system 120 operates, in accordance with one or more embodiments. The system environment 100, shown in FIG. 1, includes a central database system 110, a codebase system 120, one or more entity systems 130, and a network 150. The system environment 100 may have alternative configurations than shown in FIG. 1, including, for example, different, fewer, or additional components.

The central database system 110 is, in some embodiments, a human resources management system configured to receive and store information associated with one or more entities, corresponding to the one or more entity systems 130. Each entity may be an institution (e.g., a corporation, a partnership, a law firm, an educational institution, an organization, etc.) that employs and/or associates with one or more individuals. The central database system 110 stores information describing these individuals as well as relationships between the individuals and each of the entities. For example, the central database system 110 may include information about an individual's hiring date, employment level, position, title, geographic information, salary, benefits, tax status, contact information, and so on. The central database system 110 receives and stores characteristics describing the entities from the entity systems 130. Characteristics include, for example, information relating to an entity's size, type, industry, tax status, domicile, incorporation and/or formation, management personnel, and customer base, as well as actions performed by the entities or by individuals associated with the entities, resources used by the entities or individuals associated with the entities, and issues encountered by the entities or individuals associated with the entities.

The central database system 110 may be a server, server group or cluster (including remote servers), or other suitable computing device or system of devices. The central database system 110 may include applications configured to communicate with other devices, including those associated with the entity systems 130, via client devices over the network 150 to receive and send information about individuals and entities. Examples of client devices include conventional computer systems (such as a desktop or a laptop computer, a server, a cloud computing device, and the like), mobile computing devices (such as smartphones, tablet computers, mobile devices, and the like), or any other device having computer functionality. The devices of the entity systems 130 and the central database system 110 are configured to communicate via the network 150, for example, using a native application executed by the devices or through an application programming interface (API) running on a native operating system of the devices, such as IOS® or ANDROID™. In another example, the devices of the entity systems 130, and the central database system 110 communicate via applications or APIs running on the central database system.

The codebase system 120 manages codebase(s) for applications in the central database system 110. The codebase includes source code, test code, and other files for the central database system 110. Source code are lines of code written in one or more programming languages, including (but not limited to) applications' logic, user interface, configuration files, and/or scripts. Source code is stored in code files. Test code is written to ensure that the source code behaves as expected by automatically checking its functionality and performance against defined criteria. Test code is stored in test files.

Notably, source code in the codebase constantly changes to reflect the dynamic nature of the development of the central database system 110 and the evolving requirements of users of the central database system 110. For example, as user needs evolve or the market demands new functionalities, developers add new features to the central database system 110. Further, no software is free from bugs. As users and testers uncover glitches, errors, or unintended behaviors, developers make changes to the source code to fix these issues, improving the stability and reliability of the software. Additionally, over time, developers identify opportunities to optimize the source code for better performance. This could involve refactoring inefficient code, leveraging new technologies, or adopting better algorithms to enhance the central database system 110's speed and efficiency.

Whenever source code changes, tests need to be performed to make sure the source code functions as intended. The codebase system 120 is configured to execute the test code. During the execution of the test code, the codebase system 120 can identify code files that are accessed during the test and map these code files to executed test files. In some embodiments, initially, the codebase system 120 executes each of the test files. For each test file, a corresponding set of code files is identified and mapped to the test file. The mapping between the test file and code file may be stored in a data structure, such as a graph, a JSON file, and/or a database. Based on this data structure, the codebase system 120 can identify one or more test files for any given code file.

The codebase system 120 also monitors the codebase to detect changes made to various files, including code files and test files. Upon detecting a change made to a code file, the codebase system 120 identifies one or more test files mapped to the code file based on the data structure that stores the mapping and causes the identified one or more test files to be re-executed. On the other hand, upon detecting a change made to a test file, the codebase system 120 causes the modified test file to be re-executed and updates the mapping between the modified test file and code files based on the re-execution.

In some embodiments, the codebase system 120 provides users the capability to activate or deactivate the mapping process. For instance, the codebase system 120 may feature an "analysis mode" that users can turn on or off. Activating the analysis mode prompts the codebase system 120 to execute mapping operations during tests, while deactivating it would not trigger the mapping process during these tests.

Additional details about the codebase system 120 are further described below with respect to FIGS. 2-7.

The central database system 110, the codebase system 120, and the entities systems 130 are configured to communicate via the network 150, which may comprise any combination of local area and/or wide area networks, using wired and/or wireless communication systems. In one embodiment, the network 150 uses standard communications technologies and/or protocols. For example, the network 150 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 150 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 150 may be represented using any suitable format, such as hypertext markup language (HTML) or extensible markup language (XML). In some embodiments, all or some of the communication links of the network 150 may be encrypted using any suitable technique or techniques.

Figure 2:
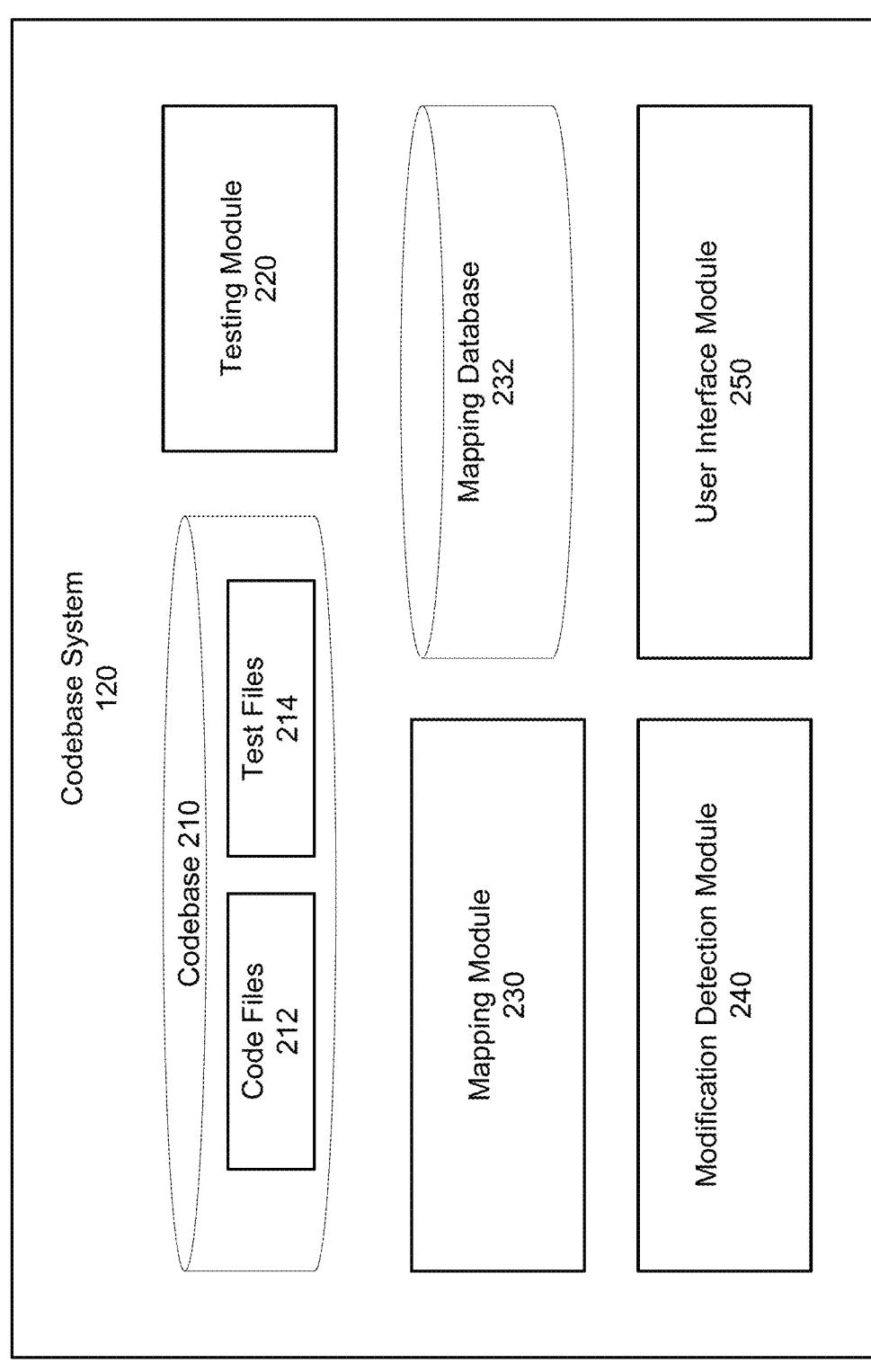
FIG. 2 is a block diagram illustrating a system architecture of the codebase system 120, in accordance with one or more embodiments.

FIG. 2 is a block diagram illustrating a system architecture of the codebase system 120, according to one embodiment. The codebase system 120 includes a codebase 210, a testing module 220, a mapping module 230, a modification detection module 240, and a user interface module 250. The codebase system 120 may have alternative configurations than shown in FIG. 2, including, for example, different, fewer, or additional components.

The codebase 210 includes code files 212 and test files 214, among others, that are used to build, deploy, and/or maintain one or more applications implemented on the central database system 110. Code files are files that are written in programming languages (such as Ruby, Python, JavaScript, Java, C++, etc.). These files contain instructions that a computer system (e.g., a computer system associated with the central database system 110) follows to perform specific tasks. Such instructions are also referred to as software. The test files 214 are code for testing the software corresponding to the code files 212, including (but not limited to) unit tests, aggregation tests, and other automated tests to ensure the source code works as expected.

The codebase 210 may also include (but is not limited to) documentation, configuration files, build scripts, dependencies, database schemas, version control metadata, license and attribution files, and miscellaneous files. Documentation is used to help developers understand how the software works and how to use it. This can range from inline comments in the source code to more comprehensive guides and API documentation. Configuration files specify parameters or settings for the software and its development environment. They can include setup configurations, dependencies, and environment-specific stings (like development, testing, and production). Building scripts automate the compilation of source code into executable programs or other executable formats. These can include scripts for tasks like compiling the code, packaging it, and deploying it. Some software may rely on external libraries or packages to function. The codebase 210 may include a list of these dependencies, often with specific versions, to ensure compatibility and stability.

For applications that use databases (e.g., central database system 110), the codebase might include database schemas, which define a structure of the databases, including tables, columns, relationships, and sometimes initial data setups. When the codebase 210 is managed with a version control system (like Git), the codebase 210 may also include version control metadata for tracking changes, managing branches and controlling versions of the software. The codebase 210 may also include a license file outlining the software's licensing terms, and possibly attribution files or notices for any third-party components or dependencies used within the software. Depending on the specific software, the codebase 210 may also include other types of files, such as assets (e.g., images, icons, etc.) and configuration for continuous aggregation/continuous deployment (CI/CD) pipelines, among others.

The testing module 220 is configured to use the test files 214 to conduct various tests on the code files 212 and/or other files. The test files 214 may include, but are not limited to, various types for different testing purposes: unit, aggregation, functional, system, acceptance, regression, performance, security, usability, and compatibility testing. Unit testing is configured to test individual units of source code (e.g., functions, methods) in isolation from the rest of an application to ensure they work as expected. Aggregation testing is configured to test aggregations between different parts of an application, such as modules or services, to ensure they work together as intended. Functional testing is configured to test an application against its functional requirements to ensure it behaves as expected from an end-user perspective. System testing is configured to test complete and fully aggregated software to verify that it meets all specified requirements. Acceptance testing is configured to evaluate if the software meets business requirements and is ready for deployment and use by end users. Regression testing is configured to verify that new code changes have not adversely affected existing functionalities of the software. Performance testing is configured to test the performance of the software under certain conditions, including its responsiveness, speed, scalability, and stability. Security testing is configured to identify vulnerabilities, threats, and risks in the software that could be exploited by attackers. Usability testing is configured to evaluate how easy and user-friendly the software is for end-users. Compatibility testing is configured to ensure the software works as expected across different devices, operating systems, browsers, and networks.

The mapping module 230 is configured to map test files 214 to code files 212. In some embodiments, the mapping module 230 determines which code files were executed when a test corresponding to a test file is performed. In some embodiments, the mapping module 230 causes the testing module 220 to perform each test corresponding to all the test files. For each test file, the mapping module 230 identifies a set of code files 212 that are executed during the execution of the test file. An initial mapping can be built. The mapping is stored in a data structure for efficient lookup. In some embodiments, the data structure is a graph. The graph includes a plurality of nodes linked by edges. Each node corresponds to a test file or a code file. Each edge linking a test file and a code file represents a mapping between the test file and the code file.

In some embodiments, the relationship between each test file and its corresponding code files is recorded using JavaScript Object Notation (JSON) objects. These mappings are then stored in a JSON file. Each test file or code file is associated with an identifier (ID), and the mapping between a test file and its corresponding code files is based on the IDs of these files. For instance, a mapping for 'testFile1' to its related code files—'codeFile1', 'codeFile2', and 'codeFile3'—may be represented by a JSON object as follows: {"testFile1_id": ["codeFile1_id", "codeFile2_id", "codeFile3_id"]}. Similarly, mappings for multiple test files to their respective code files may be recorded in a JSON object and stored in a JSON file, as shown below:

```
{
    "testFile1_id": ["codeFile1_id", "codeFile2_id", "codeFile3_id"],
    "testFile2_id": ["codeFile1_id", "codeFile4_id"],
    "testFile3_id": ["codeFile2_id", "codeFile5_id", "codeFile6_id",
    "codeFile7_id"]
    . . . .
}
```

In some embodiments, the data structure or file recording the mappings between test files and code files may be stored in a database 232 (e.g., SQLite) for efficient lookup. For example, SQLite is a lightweight database engine that provides built-in support for storing and querying JSON objects. In SQLite, JSON objects may be presented as a table, which can be queried via SQL queries. In SQLite, JSON objects may also crate indexes on properties of JSON objects to speed up queries that frequently access those properties. For example, indexes may be created based on code file IDs, and whenever a code file ID (e.g., codeFile1_id) is queried, a set of test file IDs (e.g., testFile1_id, testFile2_id) mapping to the code file ID is returned. A set of test files (e.g., test file 1 and test file 2) corresponding to the set of test file IDs can then be executed.

In some embodiments, the code files 212 in the codebase have a hierarchical relationship with each other, which may be represented by a tree data structure. For example, a first code file may include code calling a function written in a second code file. As such, the first code file is a parent of the second code file. The second code file may include code calling another function in a third code file. As such, the second code file is a parent of the third file. Since each code file is mapped to one or more test files. These test files may also correspond to the tree data structure.

The tree data structure is a hierarchical structure with a single root node from which all other nodes descend. In the tree data structure, each node (except the root) has one parent node and zero or more child nodes. Leaf nodes are the nodes without any children. They are the endpoints of the tree data structure. Any node in a tree, along with its descendants, forms a subtree. Each node in the tree data structure corresponds to a code file and its corresponding test files. A test file corresponding to a parent node is a higher-ranked test file than a test file corresponding to a descendant node.

This tree data structure may be used in re-execution of test files. For example, when a re-execution of test files is to be performed, the codebase system 120 may traverse the test files in an order based on the tree data structure. In some embodiments, the traversal may be a pre-order traversal, in which the codebase system 120 executes the test file corresponding to the root node first, then recursively does a pre-order traversal of the left subtree, followed by a recursive pre-order traversal of the right subtree. The process for a node in a pre-order is: visit, go left, then go right. In some embodiments, the traversal may be an in-order traversal, in which the codebase system 120 recursively traverses the left subtree first, then visits the root node, and finally does a recursive traversal of the right subtree. In some embodiments, the traversal may be in a post-order traversal, in which the codebase system 120 traverses the left subtree first, then the right subtree, and finally visits the root node.

In some embodiments, when a user selects a particular test file to be executed, the codebase system 120 accesses the tree data structure to identify a set of test files that are within a subtree of the particular test file and recommends execution of the set of test files with the particular test file. For example, based on the tree data structure, the codebase system 120 may identify a node corresponding to the particular test file in the tree, identify a subtree including all descendants of the identified node, and identify a set of test files corresponding to the subtree.

In some embodiments, the mapping module 230 uses a code coverage tool to determine which parts of the source code were executed by which tests. The code coverage tool may include (but is not limited to) Ruby's TracePoint and JavaScript code coverage tools. Ruby's TracePoint is able to measure code traversal during tests. In particular, Ruby's TracePoint enables monitoring specific events within Ruby interpreter, such as when a class is defined, a module is included, a method is called, or a line of code is executed. JavaScript code coverage tools, such as Jest, Istanbul, Mocha, C8, Karma Coverage, and Coveralls, may be used to achieve a mapping between frontend runtime files and backend tests.

The modification detection module 240 is configured to detect modifications that occurred in code files 212. Code files may change for a variety of reasons, primarily driven by the evolving needs of a software project, including (but not limited to) adding new features, fixing bugs, refactoring, addressing security vulnerabilities, changes in regulation or industry standards, and/or optimizing code for better performance. The modification detection module 240 may use various tools to track changes to code files over time. Such tools may include (but are not limited to) Git, Subversion, Mercurial, filesystem watches, continuous aggregation (CI) tools, build tools task runners, checksums and hashes, and/or aggregated development environments (IDEs) and editors. For example, the modification detection module 240 may be configured to detect a new code commit, and corresponding code files associated with the new code commit.

Upon detecting a modification in a code file, the modification detection module 240 accesses the mapping database 232 to identify one or more test files associated with the modified code file, and causes the test module 220 to execute the identified test files accordingly. As these modifications of code files are associated with the identified test files, only these specific files require re-execution to verify that the changes in the code file fulfill its intended functions. This targeted approach eliminates the necessity of executing the entire suite of test files, thus streamlining the testing process and reducing usage of computational resources.

Alternatively, or in addition, the modification detection module 240 is also configured to detect modifications that occurred in test files 214. Test files 214 may change for a variety of reasons, such as (but not limited to) improving test coverage, refactoring tests, fixing bugs in tests, adapting to new testing frameworks or tools, responding to performance issues, and incorporating feedback from code reviews. Upon detecting a modification in a test file, the modification detection module 240 causes the test module 220 to execute the modified test file.

During the execution of the identified one or more test files or the modified test file, the mapping module 230 is configured to map a set of code files to each test file. The mapping may or may not be the same as the previous ones recorded in the mapping database 232. Upon identifying a change in mapping, the mapping module 230 updates the mapping database 232 with the updated mapping.

The user interface module 250 is configured to receive user input and/or present test results on client devices of users. In some embodiments, the user interface module 250 is configured to visualize the mapping between the code files 212 and the test files 214. The visualization may be in a table format including a column corresponding to identifiers of code files and a column corresponding to identifiers of test files. In some embodiments, the visualization may be in a tree data structure illustrating a hierarchical structure of the mapping. In some embodiments, the user interface module 250 is configured to visualize the modifications that occurred in the code files 212, and users can interact with the visualization to execute one or more test files corresponding to the modified code files 212.

In some embodiments, the user interface module 250 is configured to visualize a list of mapping files (e.g., JSON files) generated during executions of tests. The visualization may allow users to interact with each of the mapping files. For example, a user may be able to select a particular mapping file, causing the mappings in the selected mapping file to be displayed. As another example, a user may select multiple mappings and cause the selected multiple mappings to be aggregated into a single mapping. Example graphical user interfaces (GUIs) are further illustrated and described with respect to FIGS. 4-6.

Figure 3A:
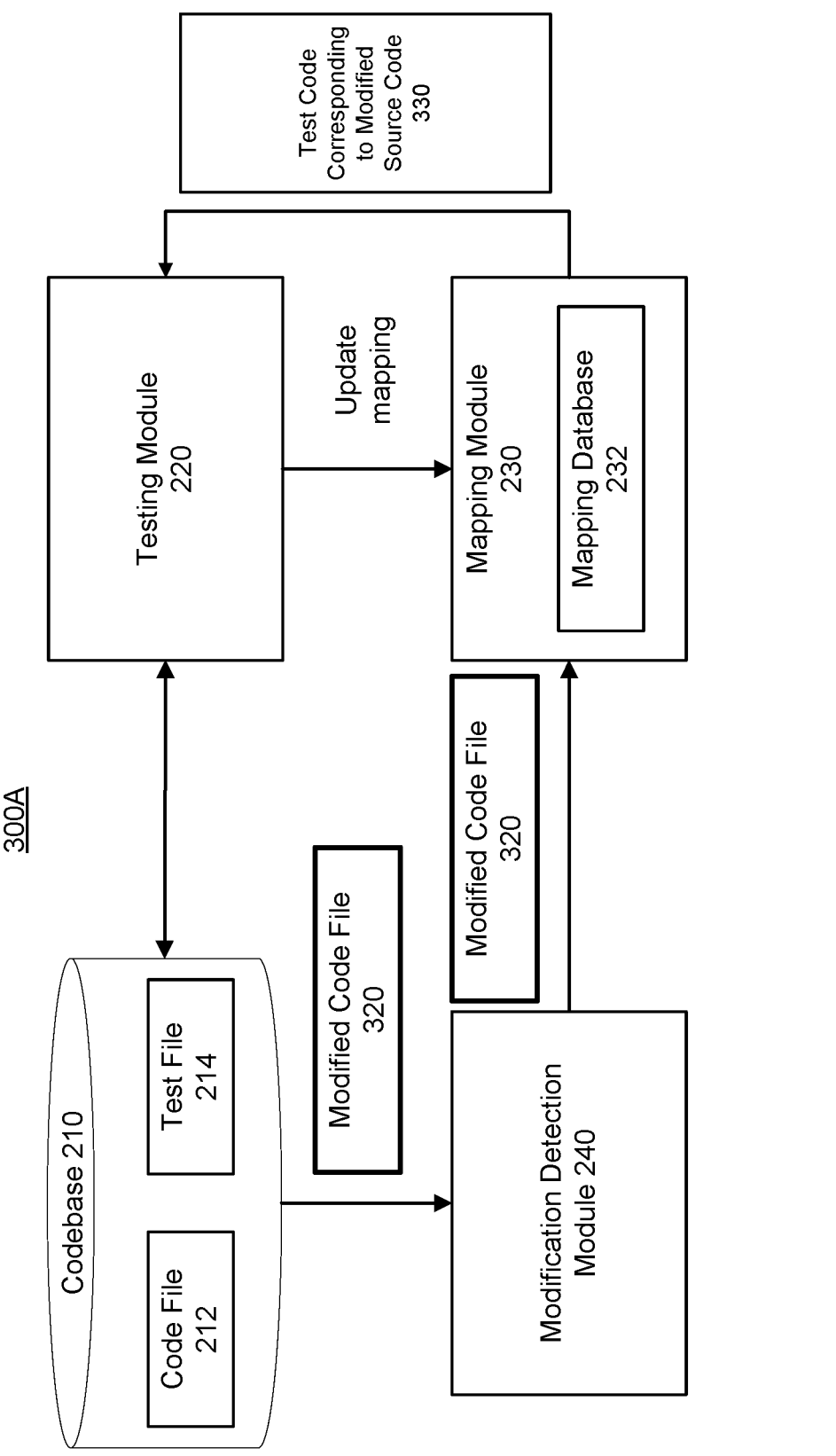
FIG. 3A illustrates an example process of performing tests upon detecting modification of source code in accordance with one or more embodiments.

FIG. 3A illustrates an example process 300A of performing tests upon detecting modification of files in accordance with one or more embodiments. The modification detection module 240 is configured to monitor the codebase 210 to detect modification of files, including code file 212 and test file 214. Upon determining that the modification of files includes modification of a set of code file 320, the modification detection module 240 sends the modified code file 320 to the mapping module 230. The mapping module 230 accesses the mapping database 232 to identify a set of test file 330 corresponding to the modified set of code file 320 and sends the identified set of test file 330 to the testing module 220, causing the testing module 220 to execute the identified set of test file 330. The identification of the set of code files and the identification of the set of test files may be based on identifiers of code files and test files. For example, the modified set of code file 320 includes identifiers of one or more code files. For each code file identifier, the mapping module 230 accesses the mapping database 232 to obtain one or more identifiers of test files that correspond to the code file identifier. The mapping module 230 obtains all the identifiers of the test files 330 corresponding to identifiers of the one or more code files 320, and sends the identifiers of the test files 330 to the testing module 220. The testing module 220 then accesses the test file 214 to obtain and execute those test files based on the received identifiers.

During or after executing those test files, the mapping module 250 monitors and identifies mappings between these test files and code files. The mapping may or may not be the same as those recorded in the mapping database 232. Upon identifying a new mapping, the mapping module 250 updates the mapping database 232 with the new mapping.

Figure 3B:
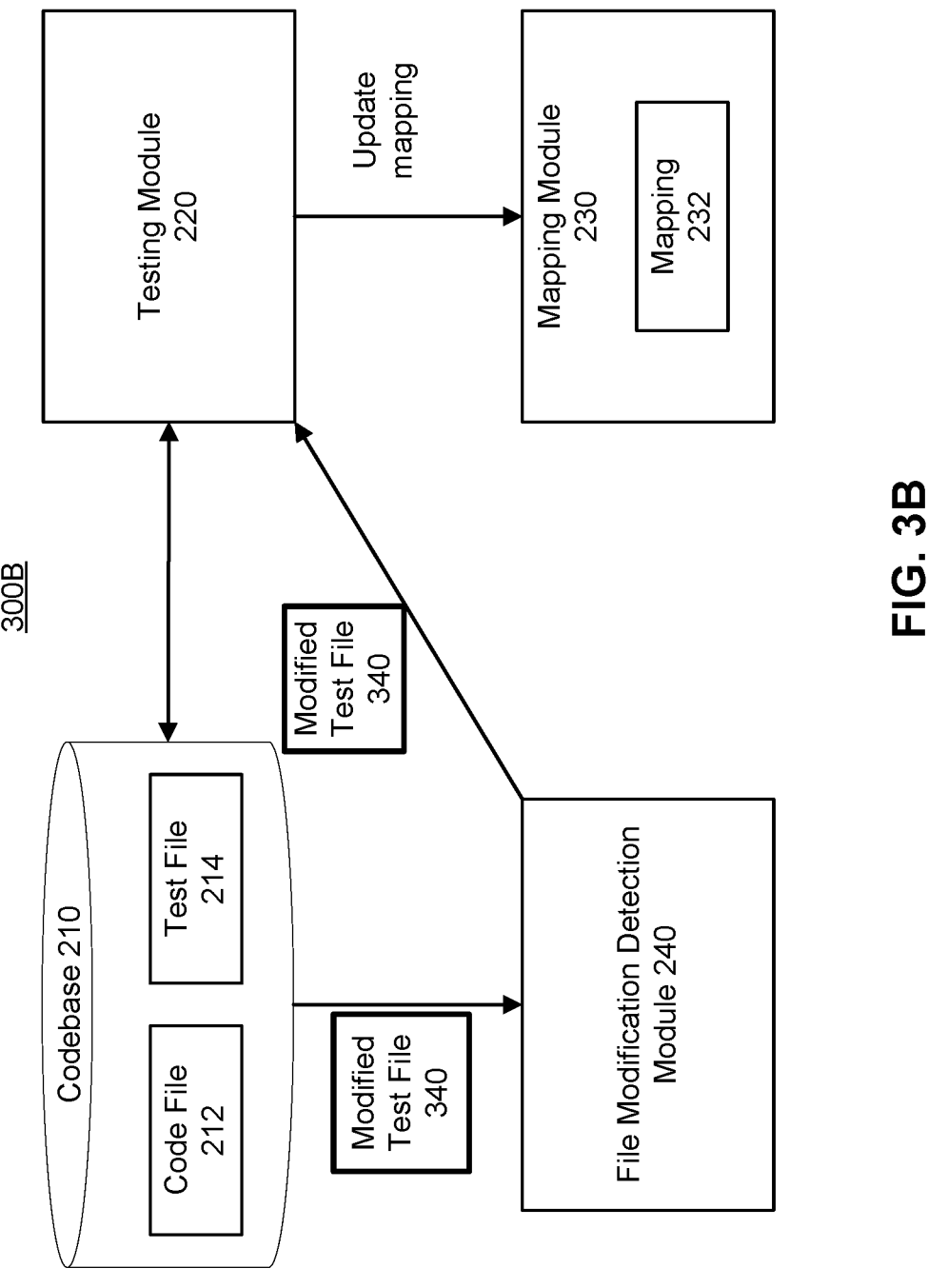
FIG. 3B illustrates an example process of performing tests upon detecting modification of test code in accordance with one or more embodiments.

FIG. 3B illustrates an example process 300B of performing tests upon detecting modification of test file in accordance with one or more embodiments. The modification detection module 240 is configured to monitor the codebase 210 to detect modification of files, including code file 212 and test file 214. Upon determining that the modification of files includes modification of a set of test file 340, the modification detection module 240 sends the modified test file 340 to the testing module 220, causing the testing module 220 to execute those test file 340. In some embodiments, the modified test file 340 is identified based on identifiers of test files 214. The file modification detection module 240 sends the identifiers of the modified test files 340 to the testing module 220. Upon receiving the identifiers of the modified test files 340, the testing module 220 accesses the codebase 210 to obtain and execute these test files.

Again, during or after executing those test files, the mapping module 250 monitors and identifies mappings between these test files and code files. The mapping may or may not be the same as those recorded in the mapping database 232. Upon identifying a new mapping, the mapping module 250 updates the mapping database 232 with the new mapping.

In some embodiments, each time a set of test files is executed, the codebase system 120 is configured to identify mappings between the set of test files and the corresponding code files on which the test files operated. The mappings may or may not be same as previously identified mappings. In some embodiments, each mapping is recorded in a data object, such as a JSON object. Mappings between each test file and their corresponding code files are recorded in a file including multiple data objects, each corresponding to a particular test file. In some embodiments, the newly recorded file is aggregated into a previously recorded file. For example, the codebase system 120 compares data objects recorded in a new file with data objects recorded in a previous file to identify changes and overwrites the changed data object with the data object recorded in the new file. In some embodiments, for each test file, an object in the new file and an object in the previous file are identified and compared. If the two data objects are different, the object in the new file is used to update an overall mapping; otherwise, no changes are required.

In some embodiments, the execution of the set of test files may not be successful, and some of the test files in the set are not executed. The codebase system 120 identifies the test files that are not executed, and re-executes those test files subsequently. The JSON objects recorded during the initial attempt of execution of the set of the test files and JSON objects recorded during a later attempt of execution of the set of the test files may be aggregated.

In some embodiments, a new file is generated and there is not mapping data associated with the new file. Upon detecting the new file, the codebase system 120 triggers re-execution of all the test files.

In some embodiments, if an initial mapping build fails (due to test failures or other issues) and results in an incomplete mapping of which parts of the code files are covered by which test, the codebase system may also opt to execute all test files to ensure comprehensive coverage.

Example GUIs

Figure 4:
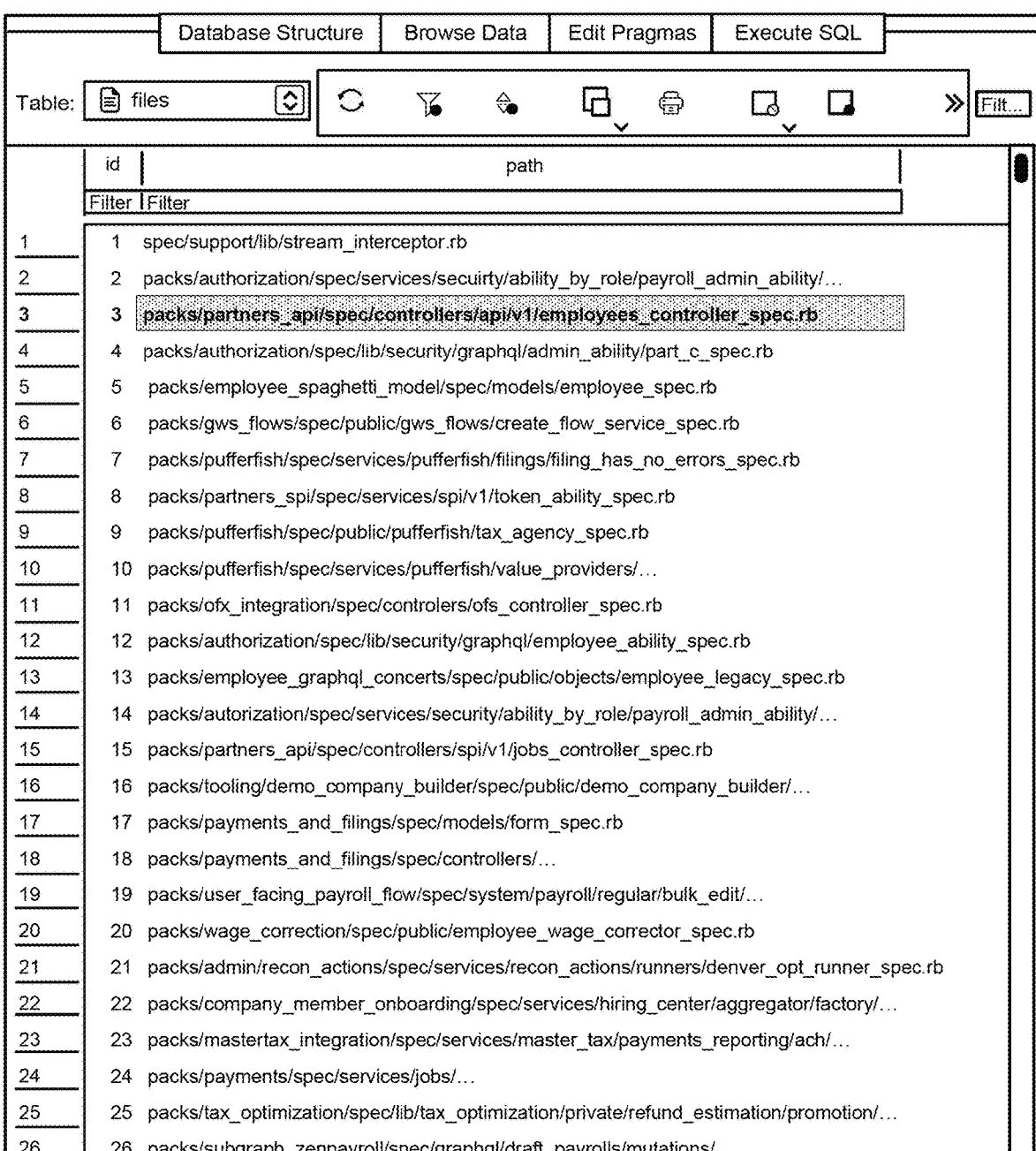
FIG. 4 illustrates an example graphical user interface (GUI) that visualizes files in a codebase in accordance with one or more embodiments.

FIG. 4 illustrates an example graphical user interface 400 that visualizes files in a codebase in accordance with one or more embodiments. For each file, an identifier and a path of the corresponding file are listed side by side. These files include code files (which may be Ruby script files) and test files (which may also be Ruby script files). For example, the first file, named "stream_interceptor.rb" with identifier "1," is a Ruby script configured to monitor and intercept data streams. It may serve as part of a security feature within the database system. The third file, named "employees_controller_spec.rb" with identifier "3," is another Ruby script designed to test functions or sections of code related to the 'employee controller.' This file likely contains various test cases simulating different requests to the actions of the employee controller (e.g., 'index,' 'show,' 'create,' 'update,' 'destroy') and checks the responses or changes in the central database system (110). These actions typically align with CRUD (Create, Read, Update, Delete) operations in applications.

Figure 5:
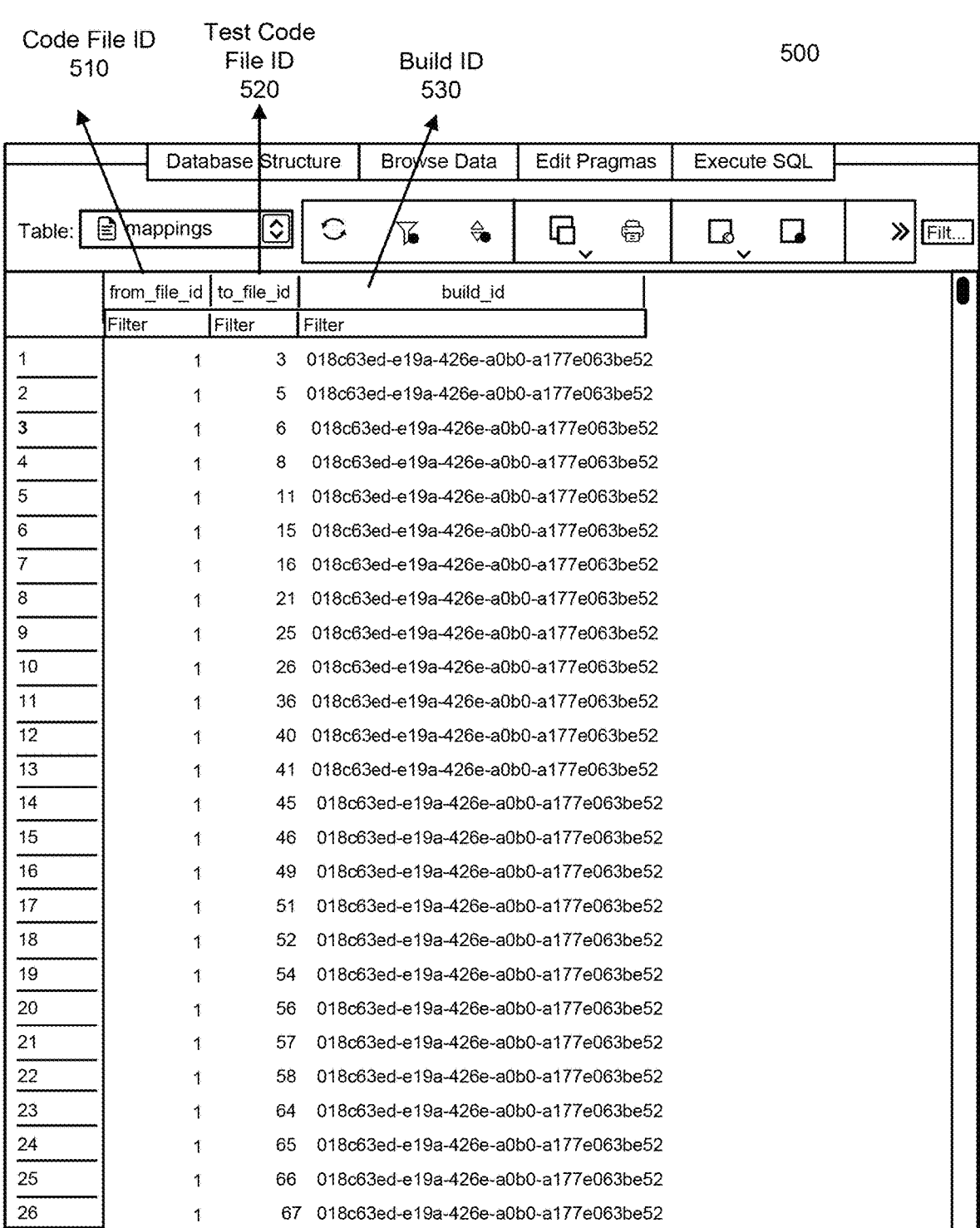
FIG. 5 illustrates an example GUI that visualizes a mapping between code files and test files in accordance with one or more embodiments.

FIG. 5 illustrates an example graphical user interface 500 that visualizes a mapping between code files and test files in accordance with one or more embodiments. The user interface displays a table with three columns: the 'from_file_id' column 510, the 'to_file_id' column 520, and the 'build_id' column 530. The 'from_file_id' column 510 lists identifiers of code files, while the 'to_file_id' column 520 lists identifiers of test files. The 'build_id' column 530 contains identifiers of a specific software build within the development process, tracking different software versions through stages of development, testing, and deployment.

As shown in FIG. 5, the code file with identifier 1 is mapped to many test files with various identifiers, including 3, 5, 6, 8, 11, 15, 16, 21, 25, etc. Referring back to FIG. 4, the code file with identifier 1 is 'stream_interceptor.rb', and the test file with identifier 3 is 'employees_controller_spec.rb'. This mapping indicates that when the code file with identifier 1 is modified, the test file with identifier 3 is to be executed. "Similarly, since the code file with identifier 1 is associated with additional test files, identified by 3, 5, 6, 8, 11, 15, 16, 21, 25, etc., modifying this code file necessitates the execution of all these associated test files.

FIG. 6 illustrates an example graphical user interface (GUI) 600 for displaying a list of test mappings in accordance with one or more embodiments. GUI 600 shows a list of mappings generated at different times. Each mapping corresponds to a JSON file that has been compressed using GZIP. A mapping file listed may be either a full mapping file or a partial mapping file. A full mapping file contains mappings between all test files and code files in the codebase, while a partial mapping file contains mappings between a subset of these files. As previously described, a complete mapping between all test files and code files may be initially generated. Subsequently, each time a subset of test files is executed due to modifications in a code file, a new partial mapping file may be created. In some embodiments, this new partial mapping file is stored as a separate JSON file and displayed in GUI 600.

In some embodiments, a new mapping file can be aggregated into a previous mapping file. For instance, following the generation of the initial mapping file that maps all test files to code files, a new mapping file mapping a subset of these files due to code file changes can be created. This new mapping file can then be aggregated into the initial mapping file. Aggregating the new mapping file into the initial file may include accessing the initial file, identifying for each test file in the subset its mapping with code files in the initial file, and updating the initial mapping file with the mappings from the new mapping file. Alternatively, aggregating may include identifying mappings for each test file not in the subset within the initial file and transferring those mappings to the new mapping file.

Furthermore, additional mapping files may be created over time. With each new mapping file generated, it may be aggregated into a previously created mapping file. In some embodiments, a partial aggregation, which combines mappings from subsets of test files and code files, may be performed. A full aggregation, on the other hand, includes merging one or more partial mapping files into a full mapping file. In some embodiments, several partial mapping files may be aggregated into a single file before being fully aggregated into a full mapping file.

In some embodiments, a full aggregation is performed periodically, such as daily or weekly. Alternatively, a full aggregation might occur after every several new mapping files, for instance, after every 10 new files. In certain situations, whether to perform a partial or full aggregation may depend on user input, allowing a user to select any number of mapping files for aggregation into a single file.

Moreover, a mapping process, whether full or partial, may be interrupted before its completion. Should a mapping process be interrupted, the codebase system 120 is configured to save the completed portion of mappings in a first mapping file, resume the mapping from the interruption point, and store the subsequent mapping in a second mapping file. Consequently, multiple mapping files could be produced for a single mapping process, which the codebase system 120 might then aggregate into a single mapping file.

In some embodiments, the GUI 600 allows users to interact with (e.g., click or hover over) each of the mapping files. Upon a user interaction with a particular mapping file, mappings contained in the mapping file are presented to the user. In some embodiments, the mappings may be presented in a table format, as shown in FIG. 5. Alternatively, or in addition, the mappings may be presented in a graph format, including nodes and edges. Alternatively, or in addition, the mappings may be presented in a tree structure with a highest level test as a root node.

Example Method for Dynamically Executing Tests

FIG. 7 illustrates an example method 700 for dynamically executing tests upon detection of file modification in accordance with one or more embodiments. The method 700 may be performed by a codebase system 120 or a computing system that has access to a codebase, including code files and test files. It should be noted that in other embodiments, the methods of FIG. 7 can include fewer, additional, or different steps than those described herein.

A codebase refers to a collection of code that is used to build a particular software system, application, or software component. In some embodiments, the codebase is a collection of code used to build a central database system 110, which may be an employment management database system. The codebase includes the code files, test files, libraries, documentation, and/or other files that developers use and maintain to develop, deploy, and manage the central database system 110. The codebase can be shared among multiple developers and be managed using version control systems, such as Git, to track changes, manage versions, and facilitate collaboration among team members.

The codebase system 120 accesses 710 a set of tests, each configured to, when executed, process one or more files within a codebase to detect presence of errors within the one or more files. In some embodiments, the one or more files are code files in the codebase, and the set of tests are a set of test files in the codebase.

The codebase system 120 generates 720 a mapping between each test of the set of tests and a corresponding set of files within the codebase by executing the set of tests and detecting, for each executed test, the set of files within the codebase on which the executed test operates. In some embodiments, each test is a test file including code to execute certain functions or methods contained in one or more code files. When the test file runs, it executes the functions or methods within one or more code files. During this execution, the codebase system 120 identifies which code files the test file is acting upon.

In some embodiments, an initial mapping is generated by executing each test in the set. For each test in the set, the codebase system 120 identifies a set of files upon which the test operates. In some embodiments, code coverage tools, such as Ruby's TracePoint or JavaScript code coverage tools, may be employed to identify the set of files for the test. In some embodiments, the tests may be a frontend test or a backend test. The files may be a frontend code file or a backend test file. In some embodiments, a backend test file may be mapped to a frontend code file, and/or a frontend test file may be mapped to a backend code file.

In some embodiments, the mapping between each test of the set of tests and a corresponding set of files is recorded in a data structure for future access. In some embodiments, the data structure is a graph having a plurality of nodes and a plurality of edges. Each node corresponds to a test (e.g., a test file) or a code file. Each edge links two nodes corresponding to a test file and a code file. In some embodiments, the graph is stored in a JSON file. In some embodiments, the JSON file is managed by a mapping database (e.g., mapping database 232), such as an SQLite database, for efficient lookup.

In some embodiments, the data structure is a table with a first column for code file identifiers and a second column for test file identifiers as shown in FIG. 5. The codebase system 120 can then identify a set of test files associated with any given code file based on its identifier.

The codebase system 120 detects 730 an update to one or more code files within the codebase. In some embodiments, the codebase system 120 utilizes various tools to track changes to code files over time. Such tools may include (but are not limited to) Git, Subversion, Mercurial, filesystem watches, continuous aggregation (CI) tools, build tools task runners, checksums and hashes, and/or aggregated development environments (IDEs) and editors.

Upon detecting the update, the codebase system 120 queries 740 the mapping to identify a subset of tests from the set mapped to the updated one or more files. In some embodiments, for each updated code file, the codebase system 120 accesses the mapping to identify one or more tests mapped to the updated code file. In some embodiments, the mapping is a mapping database (e.g., mapping database 232). For each updated code file, the codebase system 120 accesses the mapping database to identify one or more test files mapped to the updated code file.

Upon identifying the subset of the set of tests, the codebase system 120 re-executes 750 the identified subset of tests to validate the updated one or more files. As these modifications of code files are associated with the identified test files, only these specific files require re-execution to verify that the changes in the code file fulfill its intended functions. This targeted approach eliminates the necessity of executing the entire suite of test files, thus streamlining the testing process.

During or after re-executing the identified subset of tests, the codebase system 120 may update 780 the mapping between the set of tests and the set of files. For example, the codebase system 120 determines whether the mapping between each test in the subset and its corresponding files has changed based on the re-executing of the subset of tests. Upon determining a change in the mapping, the codebase system 120 updates the mapping between the tests and the corresponding files in the mapping database.

On the other side, the codebase system 120 may also detect 760 an update to one or more tests with the set of tests.

Such an update may also be detected by code change tracking tools, such as (but not limited to) Git, Subversion, Mercurial, filesystem watches, continuous aggregation (CI) tools, build tools task runners, checksums and hashes, and/or aggregated development environments (IDEs) and editors.

Upon detecting the update to one or more tests within the set of tests, the codebase system 120 re-executes 770 the one or more tests to validate their corresponding one or more files within the codebase. Again, during or after re-executing the one or more tests, the codebase system 120 may update 780 the mappings between the set of tests and the set of files.

In some embodiments, the codebase system 120 provides users the capability to activate or deactivate the mapping process. For instance, the codebase system 120 may feature an "analysis mode" that users can turn on or off. Activating the analysis mode prompts the codebase system 120 to execute mapping operations during tests, while deactivating it would not trigger the mapping process during these tests.

Example Computing System

Figure 8:
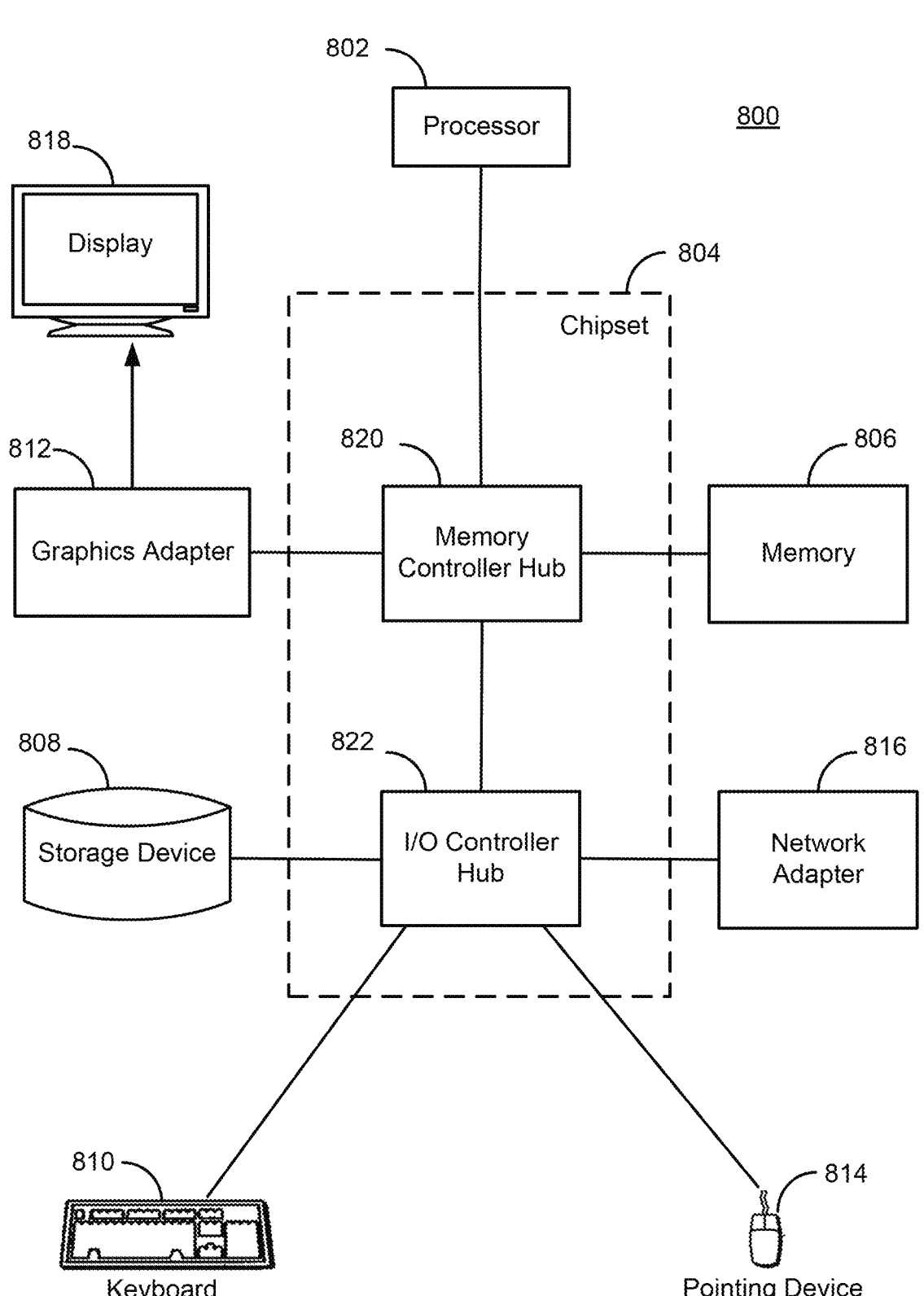
FIG. 8 is a block diagram of an example computer suitable for use in the networked computing environment of FIG. 1.

FIG. 8 is a block diagram of an example computer 800 suitable for use in the networked computing environment 100 of FIG. 1. The computer 800 is a computer system and is configured to perform specific functions as described herein. For example, the specific functions corresponding to the codebase system 120 may be configured through the computer 800.

The example computer 800 includes a processor system having one or more processors 802 coupled to a chipset 804. The chipset 804 includes a memory controller hub 820 and an input/output (I/O) controller hub 822. A memory system having one or more memories 806 and a graphics adapter 812 are coupled to the memory controller hub 820, and a display 818 is coupled to the graphics adapter 812. A storage device 808, keyboard 810, pointing device 814, and network adapter 816 are coupled to the I/O controller hub 822. Other embodiments of the computer 800 have different architectures.

In the embodiment shown in FIG. 8, the storage device 808 is a non-transitory computer-readable storage medium such as a hard drive, compact disk read-only memory (CD-ROM), DVD, or a solid-state memory device. The memory 806 holds instructions and data used by the processor 802. The pointing device 814 is a mouse, track ball, touchscreen, or other types of a pointing device and may be used in combination with the keyboard 810 (which may be an on-screen keyboard) to input data into the computer 800. The graphics adapter 812 displays images and other information on the display 818. The network adapter 816 couples the computer 800 to one or more computer networks, such as network 150.

The types of computers used by the entities and codebase system 120 of FIGS. 1 through 4 can vary depending upon the embodiment and the processing power required by the entity systems 130, central database system 110, or the codebase system 120. For example, the codebase system 120 might include multiple blade servers working together to provide the functionality described. Furthermore, the computers can lack some of the components described above, such as keyboards 810, graphics adapters 812, and displays 818.

Additional Considerations

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:
    accessing, by a codebase system, a set of tests each configured to, when executed, process one or more files within a codebase to detect a presence of errors within the one or more files;
    generating, by the codebase system, a mapping between each test of the set of tests and a corresponding set of files within the codebase by executing the set of tests and detecting, for each executed test, the set of files within the codebase on which the executed test operates;
    detecting, by the codebase system, an update to the set of tests;
    in response to detecting the update to the set of tests, updating, by the codebase system, the mapping by re-executing the updated set of tests, detecting an updated set of files corresponding to each test in the updated set of tests, and merging the mapping with the updated set of tests and the updated set of files corresponding to the updated set of tests;
    detecting, by the codebase system, an update to one or more files within the codebase;
    querying, by the codebase system, the updated mapping to identify a subset of tests from the set that are mapped to the updated one or more files; and
    re-executing, by the codebase system, the identified subset of tests to validate the updated one or more files.

2. The method of claim 1, wherein detecting an update to one or more files within the codebase comprises:
    detecting a new code commit; and
    identifying one or more code files associated with the new code commit.

3. The method of claim 1, further comprising storing the mapping in a graph data structure.

4. The method of claim 1, further comprising storing the mapping in a tree data structure comprising a plurality of nodes, each corresponding to a test.

5. The method of claim 4, further comprising re-executing each test in the set of tests in an order based on traversal of the tree data structure.

6. The method of claim 4, wherein re-executing a subset of tests is in an order based on traversal of a subtree of the tree data structure.

7. The method of claim 4, wherein re-executing a test comprises:
    determining whether re-executing the test is successful;
    responsive to determining that the re-executing of the test is successful,
        detecting a set of files within the codebase on which the executed test operates;
        recording an updated mapping between the re-executed test and the detected set of files in a data structure; and
        aggregating the updated mapping with a previously recorded mapping.

8. The method of claim 7, wherein re-executing a test comprises:
    responsive to determining that re-executing of the test is not successful,
        accessing the tree data structure to identify a node corresponding to the test;
        identifying a subtree of the node; and
        causing one or more tests corresponding to one or more nodes in the subtree to be re-executed.

9. A non-transitory computer-readable storage medium having instructions encoded thereon that, when executed by a processor, cause one or more processors to:
    access, by a codebase system, a set of tests each configured to, when executed, process one or more files within a codebase to detect a presence of errors within the one or more files;
    generate, by the codebase system, a mapping between each test of the set of tests and a corresponding set of files within the codebase by executing the set of tests and detecting, for each executed test, the set of files within the codebase on which the executed test operates;

detect, by the codebase system, an update to the set of tests;

in response to detecting the update to the set of tests, update, by the codebase system, the mapping by re-executing the updated set of tests, detecting an updated set of files corresponding to each test in the updated set of tests, and merging the mapping with the updated set of tests and the updated set of files corresponding to the updated set of tests;

detect, by the codebase system, an update to one or more files within the codebase;

query, by the codebase system, the updated mapping to identify a subset of tests from the set that are mapped to the updated one or more files; and re-execute, by the codebase system, the identified subset of tests to validate the updated one or more files.

10. The non-transitory computer-readable storage medium of claim 9, wherein detecting an update to one or more files within the codebase comprises:

detecting a new code commit; and identifying one or more code files associated with the new code commit.

11. The non-transitory computer-readable storage medium of claim 9, wherein the instructions comprise instructions configured to cause the one or more processors to store the mapping in a graph data structure.

12. The non-transitory computer-readable storage medium of claim 9, wherein the instructions comprise instructions configured to cause the one or more processors to store the mapping in a tree data structure.

13. The non-transitory computer-readable storage medium of claim 12, wherein the instructions comprise instructions configured to re-execute each test in the set of tests in an order based on traversal of the tree data structure.

14. The non-transitory computer-readable storage medium of claim 12, wherein re-executing a subset of tests is in an order based on traversal of a subtree of the tree data structure.

15. The non-transitory computer-readable storage medium of claim 12, wherein re-executing a test comprises:

determining whether re-executing the test is successful;

responsive to determining that the re-executing of the test is successful, detecting a set of files within the codebase on which the executed test operates;

recording an updated mapping between the re-executed test and the detected set of files in a data structure; and aggregating the updated mapping with a previously recorded mapping.

16. The non-transitory computer-readable storage medium of claim 15, wherein re-executing a test comprises:

responsive to determining that re-executing of the test is not successful, accessing the tree data structure to identify a node corresponding to the test;

identifying a subtree of the node; and causing one or more tests corresponding to one or more nodes in the subtree to be re-executed.

17. A computing system, comprising:

one or more processors; and a non-transitory computer-readable storage medium having instructions encoded thereon that, when executed by a processor, cause the one or more processor to:

access, by a codebase system, a set of tests each configured to, when executed, process one or more files within a codebase to detect a presence of errors within the one or more files;

generate, by the codebase system, a mapping between each test of the set of tests and a corresponding set of files within the codebase by executing the set of tests and detecting, for each executed test, the set of files within the codebase on which the executed test operates;

detect, by the codebase system, an update to the set of tests;

in response to detecting the update to the set of tests, update, by the codebase system, the mapping by re-executing the updated set of tests, detecting an updated set of files corresponding to each test in the updated set of tests, and merging the mapping with the updated set of tests and the updated set of files corresponding to the updated set of tests;

detect, by the codebase system, an update to one or more files within the codebase;

query, by the codebase system, the updated mapping to identify a subset of tests from the set that are mapped to the updated one or more files; and re-execute, by the codebase system, the identified subset of tests to validate the updated one or more files.

18. The computing system of claim 17, wherein detecting an update to one or more files within the codebase comprises:

detecting a new code commit; and identifying one or more code files associated with the new code commit.

19. The computing system of claim 17, wherein the instructions comprise instructions configured to cause the one or more processors to store the mapping in a tree data structure.

20. The computing system of claim 19, wherein the instructions comprise instructions configured to re-execute each test in the set of tests in an order based on traversal of the tree data structure.

* * * * *